United States Patent
Kuroki

(10) Patent No.: US 9,239,464 B2
(45) Date of Patent: Jan. 19, 2016

(54) IMAGING APPARATUS AND IMAGING METHOD

(75) Inventor: Yoshihiko Kuroki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 405 days.

(21) Appl. No.: 13/990,814

(22) PCT Filed: Dec. 1, 2011

(86) PCT No.: PCT/JP2011/077841
§ 371 (c)(1),
(2), (4) Date: May 31, 2013

(87) PCT Pub. No.: WO2012/077574
PCT Pub. Date: Jun. 14, 2012

(65) Prior Publication Data
US 2013/0258069 A1    Oct. 3, 2013

(30) Foreign Application Priority Data

Dec. 8, 2010  (JP) ................................. 2010-273648

(51) Int. Cl.
*G02B 27/22* (2006.01)
*H04N 13/02* (2006.01)
(52) U.S. Cl.
CPC .............. *G02B 27/22* (2013.01); *H04N 13/025* (2013.01); *H04N 13/0217* (2013.01); *H04N 13/0242* (2013.01)
(58) Field of Classification Search
None
See application file for complete search history.

(56) References Cited

U.S. PATENT DOCUMENTS

2011/0012899 A1* 1/2011 Inoue et al. ................... 345/419

FOREIGN PATENT DOCUMENTS

| JP | 2009-300268 A | 12/2009 |
|---|---|---|
| JP | 2010-081580 A | 4/2010 |

* cited by examiner

*Primary Examiner* — Dave Czekaj
*Assistant Examiner* — Nam Pham
(74) *Attorney, Agent, or Firm* — Hazuki International, LLC

(57) ABSTRACT

The present invention relates to an imaging apparatus and an imaging method so as to be able to obtain disparity information, without deteriorating the image quality of the image. Incident light from a subject is made to be parallel light by a relay lens unit 33, part thereof is reflected by a transmissive mirror 35, and the remaining incident light transmits the transmissive mirror 35. An imaging device 39 performs photoelectric conversion on the incident light which has transmitted the transmissive mirror 35 and images a basic image, and an imaging device 40 performs photoelectric conversion on the incident light which has reflected off of the transmissive mirror 35 and images disparity detection images. A disparity image generating unit 44 replaces pixel values of each pixel on the disparity detection images into the pixel values on the pixels on the basic image corresponding to these pixels and generates right and left disparity images. In this way, if used high-quality basic image and disparity detection image having disparity information, high-quality disparity image pair with appropriate disparity can be obtained. The present invention can be applied to a camera.

11 Claims, 10 Drawing Sheets

FIG. 4

| LENS | LENS STANDARD | | | CONDITIONS | | DISTANCE BETWEEN CENTERS OF GRAVITY [mm] (THEORETICAL VALUE) | BASE-LINE LENGTH [mm] (EXPERIMENTAL VALUE) |
|---|---|---|---|---|---|---|---|
| | SMALLEST F-STOP | FOCAL DISTANCE [mm] | ZOOM RATIO [TIMES] | FOCAL DISTANCE [mm] | SHOOTING DISTANCE [m] | | |
| #A | 1.8 | 10—100 | 10 | 100 | 6.5 | 23.1 | 20.0 |
| #B | 2.8 | 13.5—570 | 42 | 100 | 6.5 | 14.9 | 12.0 |

IMAGING APPARATUS AND IMAGING METHOD

TECHNICAL FIELD

The present invention relates to an imaging apparatus and an imaging method, and in particular, an imaging apparatus and an imaging method where disparity information can be obtained without deteriorating image quality of the image.

BACKGROUND ART

Heretofore, a system to display stereoscopic image by imaging a common subject by two video cameras from the right and left at the same time, and presenting the obtained image to each of right and left eyes, is known. However, with such a system, the device is large and not only mobility is lacking, but also shift of the optical axis of the right and left cameras easily happens, and obtaining image with appropriate disparity has been difficult.

For example, there are some cases where an interval between two cameras becomes great, or the right and left optical axes are shifted during zooming due to individual difference of the lenses of the cameras, or the right and left screen size not being the same. Also, there have been other cases in that, at the time of focus operating, during operation of directing the right and left video cameras toward the subject, i.e., when performing convergence operations, right and left video cameras shift vertically.

If such shift in optical axes or the like occurs between right and left cameras, it forces the optical system of a user who is viewing stereoscopic images to perform information processing different from what is experienced in normal life, so this is a factor of visual fatigue. Further, when the user superimposes and views the right and left image without using glasses for stereopsis, the video appears unnatural since the subject looks double.

Accordingly, an imaging apparatus has been proposed such that, with a region serving as the pupil of a lens, light from a subject is divided into two light fluxes by a mirror and imaging is performed (see PTL 1, for example). With this imaging apparatus, by performing imaging with each of the two divided light fluxes, disparity information of the subject can be obtained and at the same time, an image for stereopsis to present to the right and left eyes can be obtained.

CITATION LIST

Patent Literature

PTL 1: Japanese Unexamined Patent Application Publication No. 2010-81580

SUMMARY OF INVENTION

Technical Problem

However, with the above-described technique, disparity information of the subject can be obtained, but deterioration of the image quality of the image with which to display a stereoscopic image may occur.

Specifically, for example, the light flux from the subject is divided into two light fluxes to obtain an image for the left eye and for the right eye by a mirror, so due to the input angle or the like as to the mirror of the light flux from the subject, the thicknesses of the two divided two light fluxes change. If the thickness of these two light fluxes is different, brightness and resolution of the right and left image will be unequal.

The present invention has been made in the light of these situations, and it is an object thereof to enable obtaining of disparity information without deterioration of image quality of the image.

Solution to Problem

An aspect of the present invention is an imaging apparatus, including: first converging means to converge incident light from a subject; transmitting means to transmit the incident light converged by the first converging means to be parallel light; splitting means to transmit, at a predetermined transmittance, the incident light made to be parallel light by the transmitting means and also split part of the incident light made to be the parallel light to the right and left; second converging means to converge the incident light which has transmitted the splitting means; first imaging means to image a basic image of the subject, by converting the incident light converged by the second converging means into electric signals; third converging means to converge each incident light split by the splitting means; and second imaging means to image disparity detection image having disparity as to each other, by converting each of the incident light converged by the third converging means into electrical signals.

The imaging apparatus may further include disparity image generating means to generate disparity images so as to perform stereoscopic display of the subject, by generating images with the same point of view as with the disparity detection images, regarding each of the disparity detection images, based on the basic image.

The disparity image generating means may generate the disparity images, by taking a pixel of the disparity image to be generated as the pixel of interest, and obtaining a pixel value of the pixel of interest, based on a pixel value of the pixel in the base image corresponding to the pixel of the disparity detection image which is at the same position as with the pixel of interest.

The imaging apparatus may further include amount of light adjusting means which, being arranged between the transmitting means and splitting means, shield part of the incident light from the transmitting means, so as to change the distance between centers of gravity of the incident light split to the right and left by the splitting means.

The amount of light adjusting means may shield part of the incident light so that the distance between centers of gravity is 7 to 65 mm.

The first converging means may include a zoom lens to magnify an image of the subject, and wherein relative disparity between the disparity detection images is controlled by magnification of the image of the subject by the zoom lens.

The first imaging means and the second imaging means may image the basic image and disparity detection image with a rate of 60 frames per second or more.

The first imaging means and the second imaging means may image the basic image and disparity detection image with a rate of 230 to 250 frames per second.

The first imaging means and the second imaging means may image the basic image and disparity detection image with a rate of 290 to 310 frames per second.

The first imaging means and the second imaging means may image the basic image and disparity detection image with a rate of 590 to 610 frames per second.

The imaging apparatus may further include storage means to store the disparity images; and display control means to perform stereoscopic display of the subject, based on the disparity images stored in the storage means.

An imaging method of an aspect of the present invention includes the steps of: first converging means converging incident light from a subject, transmitting means transmitting the incident light converged by the first converging means to be parallel light, splitting means transmitting, at a predetermined transmittance, the incident light made to be parallel light by the transmitting means and also splitting part of the incident light to be the parallel light to the right and left, second converging means converging the incident light which has transmitted the splitting means, first imaging means imaging a basic image of the subject, by converting the incident light converged by the second converging means into electric signals, third converging means converging each incident light split by the splitting means, and second imaging means imaging disparity detection image having disparity as to each other, by converting each of the incident light converged by the third converging means into electrical signals.

With an aspect of the present invention, the incident light from the subject is converged by the first converging means, the incident light converged by the first converging means is transmitted by the transmitting means so as to be parallel light, the incident light made to be parallel light by the transmitting means transmits the splitting means with a predetermined transmittance and part of the incident light made to be the parallel light is also split to the right and left by the splitting means, the incident light which has transmitted the splitting means is converged by the second converging means, by the incident light being converged by the second converging means is converted into electric signals by the first imaging means, a basic image of the subject is imaged, by each of the incident light split by the splitting means being converged and each of the incident light converged by the third converging means being converted into electric signals by the third converging means, and disparity detection images having disparity as to each other are imaged by the second imaging means.

Advantageous Effects of Invention

According to an aspect of the present invention, disparity information can be obtained without deteriorating the image quality of the image.

BRIEF DESCRIPTION OF DRAWINGS

FIG. 4 is a diagram describing a relationship between distance between centers of gravity and base-line length.

DESCRIPTION OF EMBODIMENTS

In the following, description will be made regarding an embodiment to which the present invention has been applied, with reference to the diagrams.

First Embodiment

Configuration Example of Imaging Apparatus

Figure 1:
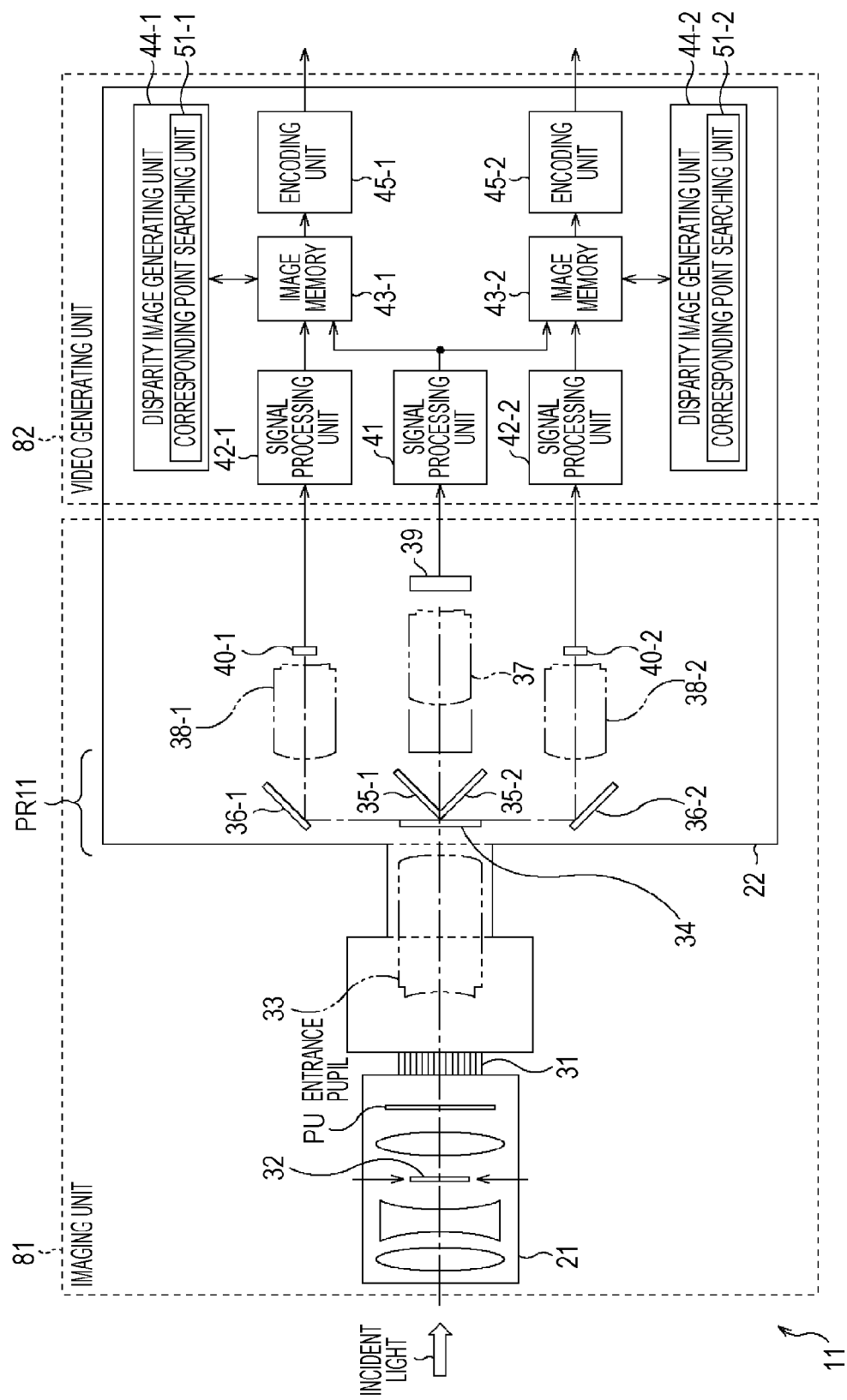
FIG. 1 is diagram illustrating a configuration example of an embodiment of an imaging apparatus to which the present invention has been applied.

FIG. 1 is a diagram illustrating a configuration example of an embodiment of an imaging apparatus to which the present invention has been applied. More specifically, FIG. 1 illustrates a sectional view from the top of the imaging apparatus.

This imaging apparatus 11 receives incident light from the subject and generates disparity image for right eye and left eye so as to display stereoscopic image of the subject.

Here, disparity image for right eye and disparity image for left eye are images to be displayed such that they will be observed with the user's right eye and left eye when performing stereoscopic display with each. Hereinafter, disparity image for right eye and left eye will be referred to simply as right and left disparity image. Also, hereinafter, description will proceed with the understanding that in the diagram, the upper side is on the subject's right from the imaging apparatus 11 and lower side is on the subject's left from the imaging apparatus 11.

The imaging apparatus 11 is made up of an interchangeable lens 21 and a body 22 and the interchangeable lens 21 is mounted on a lens mount 31 provided with the body 22.

The interchangeable lens 21 is made up of a lens group to converge the incident light from a subject and includes a diaphragm 32, in addition to a lens group such as a focus lens for focusing, a zoom lens to magnify the image of the subject, and the like. Image formation of the incident light converged by the interchangeable lens 21 is performed inside the lens mount 31 to be an inverted image which is horizontally reversed, and is input to the relay lens unit 33 provided within the body 22.

The relay lens unit 33 is made up of a relay lens which transmits the incident light input from the interchangeable lens 21 to the position of the diaphragm 34 provided downstream. The diffused light from a point light source of the subject (objective focal position) become parallel light at the position of the diaphragm 34 by this relay lens unit 33. Part of the incident light from the subject which has been made to be parallel light by the relay lens unit 33 is partially shielded by the diaphragm 34 and is input to the transmissive mirror 35-1 and transmissive mirror 35-2. Also, in the imaging apparatus 11, an image of the diaphragm 34 is positioned inside the interchangeable lens 21 as entrance pupil PU.

Edges of the transmissive mirror 35-1 and transmissive mirror 35-2 are adjacent to each other and are arranged inclined in different directions to each other on the optical axis of the optical system which makes up the body 22. With an example in FIG. 1, the transmissive mirror 35-1 and transmissive mirror 35-2 meet at a right angle and the transmissive mirror 35-1 and transmissive mirror 35-2 are arranged so as to assume angles of 45 degrees and −45 degrees against the optical axis of the optical system.

The transmissive mirror 35-1 and transmissive mirror 35-2 input part of the incident light input from the relay lens unit 33 by reflecting in the upper direction and lower direction in the diagram to the mirror 36-1 and mirror 36-2, and transmit the remainder of the incident light so as to be input to the condenser lens 37. Also, the mirror 36-1 and mirror 36-2 reflect the incident light input from the transmissive mirror 35-1 and transmissive mirror 35-2 and input to the condenser lens 38-1 and condenser lens 38-2.

Here, the transmissive mirror 35-1 and mirror 36-2 are arranged in the same position with the diaphragm 34 on the optical-axis direction of the optical system of the body 22 and makes up beam splitters to horizontally split a portion of the condensed light. That is to say, light viewed as from the left side of the subject is horizontally inverted and a portion thereof is reflected by the transmissive mirror 35-1 and mirror 36-1. Also, light viewed as from the right side of the subject is horizontally inverted and a portion thereof is reflected by the transmissive mirror 35-2 and mirror 36-2.

In this way, imaging a portion of incident light input to the imaging apparatus 11 is horizontally split by the beam splitter made up of the transmissive mirror 35-1 and mirror 36-2. Note that the position where the transmissive mirror 35-1 and transmissive mirror 35-2 are arranged is included in a parallel light region PR11 where the diffused light from the point light source at the objective focal position inside the lens mount 31 (the position of the subject) becomes parallel light, and this enables proper splitting.

Of the incident light which has passed the diaphragm 34, light flux split the spectrum by the transmissive mirror 35-1 and mirror 36-1, i.e., light viewed as from the left side of the subject is converged by the condenser lens 38-1. Also, of the incident light which has passed the diaphragm 34, light flux split the spectrum by the transmissive mirror 35-2 and mirror 36-2, i.e., light viewed as from the right side of the subject is converged by the condenser lens 38-2. Further, of the incident light which has passed the diaphragm 34, the light which has transmitted the transmissive mirror 35-1 and transmissive mirror 35-2 is converged by the condenser lens 37.

At this time, the condenser lens 37, condenser lens 38-1, and condenser lens 38-2 effect image formation of the input incident light on the light receiving surfaces of the imaging device 39, imaging device 40-1, and imaging device 40-2, respectively. The images of the incident light formed on the light receiving surfaces are erect images.

The imaging device 39, imaging device 40-1, and imaging device 40-2 are made up of an imaging sensor such as a CCD (Charge Coupled Devices) or CMOS (Complementary Metal Oxide Semiconductor), for example.

The imaging device 39 images the image of the subject (hereinafter, referred to as basic image) by converting the incident light input from the condenser lens 37 into electrical signals, and supplies the basic image obtained thereby to a signal processing unit 41. Here, the basic image is an image based on which a disparity image will be generated.

The imaging device 40-1 and imaging device 40-2 perform imaging of the image of the subject (hereinafter, referred to as disparity detecting image) by converting the incident light input from the condenser lens 38-1 and condenser lens 38-2 into electrical signals. The imaging device 40-1 and imaging device 40-2 supply a disparity detection image obtained by imaging, to the signal processing unit 42-1 and signal processing unit 42-2.

Here, the disparity detection image imaged by the imaging device 40-1 is an image of the subject viewing the subject from the left side (for example, left eye). This disparity detection image (hereinafter, particularly referred to as disparity detection image for left eye) is used as disparity information when generating disparity image for left eye. That is to say, image of the subject looked from a point of view of the disparity detection image for left eye is generated as disparity image for left eye.

In the same way, the disparity detection image imaged by the imaging device 40-2 is an image of the subject viewing the subject from the right side (for example, right eye), and this disparity detection image (hereinafter, particularly referred to as disparity detection image for right eye) is used as disparity information when generating disparity image for right eye.

The right and left disparity detection images thus imaged in the imaging apparatus 11 and the basic image are both images with disparity. These basic image and disparity detection images may be a still image or a moving image.

Note that, in the following, in the event that there is no need to distinguish between the transmissive mirror 35-1 and transmissive mirror 35-2 in particular, these will be referred to simply as transmissive mirror 35, and in the event that there is no need to distinguish between the mirror 36-1 and mirror 36-2 in particular, these will be referred to simply as mirror 36. Also, in the following, in the event that there is no need to distinguish between the condenser lens 38-1 and condenser lens 38-2 in particular, these will be referred to simply as condenser lens 38, and in the event that there is no need to distinguish between the imaging device 40-1 and imaging device 40-2 in particular, these will be referred to simply as imaging device 40.

The signal processing unit 41 subjects the basic image supplied from the imaging device 39 to various signal processing such as A/D (Analog/Digital) conversion processing, demosaicing processing, and white balance adjustment processing, and supplies this to the image memory 43-1 and image memory 43-2.

The signal processing unit 42-1 and signal processing unit 42-2 subjects the disparity detection image supplied from the imaging device 40-1 and imaging device 40-2 to various signal processing such as A/D (Analog/Digital) conversion processing, demosaicing processing, and white balance adjustment processing, and supplies this to the image memory 43-1 and image memory 43-2. Note that, in the following, in the event that there is no need to distinguish between the signal processing unit 42-1 and signal processing unit 42-2 in particular, these will be referred to simply as signal processing unit 42.

The image memory 43-1 and image memory 43-2 temporarily store the basic image from the signal processing unit 41 and the disparity detection images from the signal processing unit 42-1 and signal processing unit 42-2. Also, the image memory 43-1 and image memory 43-2 temporarily store disparity image supplied from the disparity image generating unit 44-1 and disparity image generating unit 44-2, and supplies the stored disparity image to the encoding unit 45-1 and encoding unit 45-2.

Note that, in the following, in the event that there is no need to distinguish between the image memory 43-1 and image memory 43-2 in particular, these will be referred to simply as image memory 43.

The disparity image generating unit 44-1 acquires disparity detection image and basic image from the image memory 43-1, generates a disparity image for the left eye based on the disparity detection image and basic image, and supplies this to the image memory 43-1. The disparity image generating unit 44-1 includes a corresponding point searching unit 51-1, and the corresponding point searching unit 51-1 searches for pixels in the basic image corresponding to the pixels regarding each pixel of the disparity detection image at the time of generating disparity image. Note that the corresponding image is the image where the same subject is displayed, and in the following, the pixels in the basic image corresponding to the pixels of the disparity detection image will be referred to as corresponding pixels.

The disparity image generating unit 44-2 acquires the disparity detection image and basic image from the image memory 43-2, generates disparity image for right eye based on the disparity detection image and basic image, and supplies this to the image memory 43-2. The disparity image generating unit 44-2 includes corresponding point searching unit 51-2, and the corresponding point searching unit 51-2 searches for the corresponding pixels in the basic image corresponding to the pixels regarding each pixel of the disparity detection image at the time of generating disparity image.

Note that in the event that there is no need to distinguish between the disparity image generating unit 44-1 and disparity image generating unit 44-2 in particular, these will be referred to simply as disparity image generating unit 44, and in the event that there is no need to distinguish between the corresponding point searching unit 51-1 and corresponding point searching unit 51-2 in particular, these will be referred to simply as the corresponding point searching unit 51.

The encoding unit 45-1 and encoding unit 45-2 read out and encode the disparity image from the image memory 43-1 and image memory 43-2 and outputs. Note that, in the following, in the event that there is no need to distinguish between the encoding unit 45-1 and encoding unit 45-2 in particular, the will be referred to simply as encoding unit 45.

We can consider that the imaging apparatus 11, which generates disparity image as described above, to be made up of two function blocks, with the imaging unit 81 to image the disparity detection image and basic image, and the video generating unit 82 to generate the disparity image from the imaged disparity detection image and basic image.

Here, the imaging unit 81 is made up of the interchangeable lens 21, lens mount 31, and relay lens unit 33 through imaging device 40, and the video generating unit 82 is made up of the signal processing units 41 through encoding unit 45.

[Description of Disparity Image Generating Processing]

Next, description will be made regarding operation of the imaging apparatus 11.

For example, when a user operates the imaging apparatus 11, and instructs to generate right and left disparity image so as to perform stereoscopic image of the subject, the imaging apparatus 11 starts disparity image generating processing and generates disparity image.

In step S11, the transmissive mirror 35 separates a light flux 10 input from the subject.

That is to say, upon the user operating the imaging apparatus 11 so as to start imaging, the incident light from the subject is converged by the interchangeable lens 21 and further made to be parallel light by the relay lens unit 33. After part of the incident light input from the relay lens unit 33 is shielded by the diaphragm 34 and adjustment of amount of light is performed, this is input to the transmissive mirror 35. The transmissive mirror 35 transmits part of the input incident light, inputs to the condenser lens 37, and reflects the remaining incident light.

The incident light input to the transmissive mirror 35 is reflected by the mirror 36 and further converged at the condenser lens 38 and input to the imaging device 40. Also, the incident light which has transmitted the transmissive mirror 35 is converged at the condenser lens 37 and input to the imaging device 39.

For example, in the event that transmittance of the transmissive mirror 35 is 50%, half of the incident light from the subject is input to the imaging device 39 and one-fourth light of the incident light is input to the two imaging devices 40.

Note that the basic image imaged by the imaging device 39 is the image based on which the final disparity image will be generated, so the transmittance of light of the transmissive mirror 35 is preferably as high as possible.

In step S12, the imaging device 39 images the basic image by converting the incident light input from the condenser lens 37 into electrical signals. The basic image obtained in this way is, of which amount of light of the incident light input in the imaging device 39 is generally lowered by an amount equivalent to the reflectance of the transmissive mirror 35, the same as with an image obtained by imaging the subject with a general imaging apparatus. Accordingly, if reflectance (transmittance) at the transmissive mirror 35 is set as appropriate, deterioration of the image quality does not occur, thereby obtaining a high-definition basic image.

The imaging device 39 supplies the basic image obtained by imaging to the signal processing unit 41. The signal processing unit 41 subjects the basic image from the imaging device 39 to various signal processing such as A/D conversion processing, and supplies this to the image memory 43 so as to store it.

In step S13, the imaging device 40 images the disparity detection image and supplies the obtained disparity detection image to the signal processing unit 42, by converting the incident light input from the condenser lens 38 into electrical signals. The signal processing unit 42 subjects the disparity detection image from the imaging device 40 to various signal processing such as A/D conversion processing, and supplies this in the image memory 43 so as to store it.

There are cases where the right and left disparity detection image obtained in this way do not have the same thickness of the light fluxes input to each of the two imaging devices 40, so brightness and resolution may not be equal between the right and left. However, in these disparity detection image, information relating to the disparity of the subject from a different point of view is included in these disparity detection images, so a high-definition disparity image where brightness and the like are equal between right and left can be obtained by using disparity information obtained from the disparity detection image and high-definition basic image.

In step S14, the corresponding point searching unit 51 searches for the corresponding image on the basic image stored in the image memory 43, regarding each pixel of the disparity detection image stored in the image memory 43. For example, searching for the corresponding pixels is performed between the disparity detection image and basic image, by taking a predetermined region made up of one or multiple pixels as an increment and calculating correlation and sum of difference absolute value.

Specifically, in the event that searching for the corresponding pixels is performed using the sum of absolute differences, the corresponding point searching unit 51 takes a pixel on the disparity detection image as the pixel of interest and also takes the predetermined region where the pixel of interest on the disparity detection image is the center, as a region of interest. Also, the corresponding point searching unit 51 finds, by taking a predetermined region on the basic image with the same magnitude as with the region of interest as a corresponding region of interest, the absolute difference between the pixel value of the same positional pixel of the region of interest and corresponding region of interest, and calculates the sum of the absolute differences of each pixel (sum of absolute differences).

The corresponding point searching unit 51 searches for the corresponding region of interest where the sum of absolute differences is smallest, by moving the position of the corresponding region of interest on the basic image and calculating the above-described sum of absolute differences. The corresponding point searching unit 51 then takes the pixel which is positioned in the center of the corresponding region of interest where the sum of absolute differences is smallest, i.e., the pixel which is the same position as with the pixel of interest, as a corresponding pixel as to the pixel of interest. In this way, the corresponding point searching unit 51 searches for the corresponding pixel on the basic image as to the pixel thereof, for each pixel on the disparity detection image.

The corresponding region of interest where the sum of absolute differences is smallest is the most similar region in the basic image as to the region of interest on the disparity detection image, so we can say that the a corresponding pixel is a region where the same subject as with the pixel of interest is displayed.

Also, for example, in the event that searching for the corresponding pixels is performed using correlation, the corresponding point searching unit 51 takes a pixel on the disparity detection image as a pixel of interest and also takes the predetermined region where the pixel of interest on the disparity detection image is the center, as a region of interest. Also, the corresponding point searching unit 51 calculates the correlation value of the region of interest and corresponding region of interest with the predetermined region on the basic image of the same magnitude as with the region of interest as the corresponding region of interest.

For example, if we say that region of interest and corresponding region of interest are regions made up of N pixels, and the pixel value of the i'th pixel (where 1≤i≤N) in the region of interest is $x_i$ and the pixel value of the pixel of the corresponding region of interest which is in the same position as with this i'th pixel is $y_i$, the correlation value C is obtained by the following Expression (1).

[math. 1]

$$\text{Correlation value } C = \frac{\sum_{i=1}^{N}(x_i - X)(y_i - Y)}{\sqrt{\sum_{i=1}^{N}(x_i - X)^2} \sqrt{\sum_{i=1}^{N}(y_i - Y)^2}} \quad (1)$$

Note that, in Expression (1), X represents an average value of the pixel values in the pixel within the region of interest, and Y represents an average value of the pixel values in the pixel within the corresponding region of interest. The greater the correlation value C found in this way is, the higher the correlation between the region of interest and corresponding region of interest is.

The corresponding point searching unit 51 searches for the corresponding region of interest where the correlation value C is maximum, by calculating the correlation value C moving the position of the corresponding region of interest on the basic image. The corresponding point searching unit 51 then takes the pixel which is positioned in the center of the corresponding region of interest where the correlation value C is maximum, i.e., the pixel which is the same position as with the pixel of interest as a corresponding pixel as to the pixel of interest. In this way, if the correlation value is used, even in the event that there is luminance difference between the disparity detection image and basic image, corresponding pixels can be detected with high precision.

In step S15, the disparity image generating unit 44 generates a disparity image based on the search result of the corresponding pixels, and supplies the obtained disparity image to the image memory 43 to store. The disparity image generating unit 44 generates the disparity image by moving the corresponding pixels on the basic image to the position of each pixel of the disparity detection image, and performing interpolation processing using the corresponding pixels.

Specifically, for example, the disparity image generating unit 44 generates the disparity image by taking a pixel on the disparity image which is to be generated as a pixel of interest, and taking a pixel value of the corresponding pixel as to the pixel of the disparity detection pixel which is in the same position as the pixel of interest, as the pixel value of the pixel of interest. In this case, an image where each pixel on the disparity detection image has been replaced with the corresponding pixel on the basic image corresponding to the pixels thereof and obtained, is taken as the disparity image.

Generating right and left disparity images using one high-definition basic image, the basic image itself is reflected in the disparity image with regard to image quality such as brightness and resolution, so as a result, a disparity image where the image quality such as brightness and resolution is equal between the right and left can be obtained.

The disparity image obtained in this way is stored in the image memory 43, encoded by the encoding unit 45 and output downstream. The disparity image output downstream is displayed on the display unit or stored in the storing unit. When the disparity image is output from the imaging apparatus 11, the disparity image generating processing is ended.

As described above, at the transmissive mirror 35, disparity information can be obtained without deteriorating image quality of the image of the subject, by transmitting incident light with a predetermined transmittance and imaging a basic image and at the same time, splitting the remaining incident light into right and left and imaging right and left disparity detection images.

In particular, transmittance of the transmissive mirror 35 being set as appropriate allows appropriate allocation of amount of light to the imaging sensor 39 and imaging sensor 40, i.e., appropriate allocation of the image quality to be performed. Using the basic image and disparity detection image obtained by imaging then enables obtaining of a disparity image with an appropriate magnitude of disparity and a disparity image in which the image quality is equal between the right and left, while maintaining the image quality of the basic image, thereby displaying a high-definition stereoscopic image.

[Division of Entrance Pupil]

Figure 3:
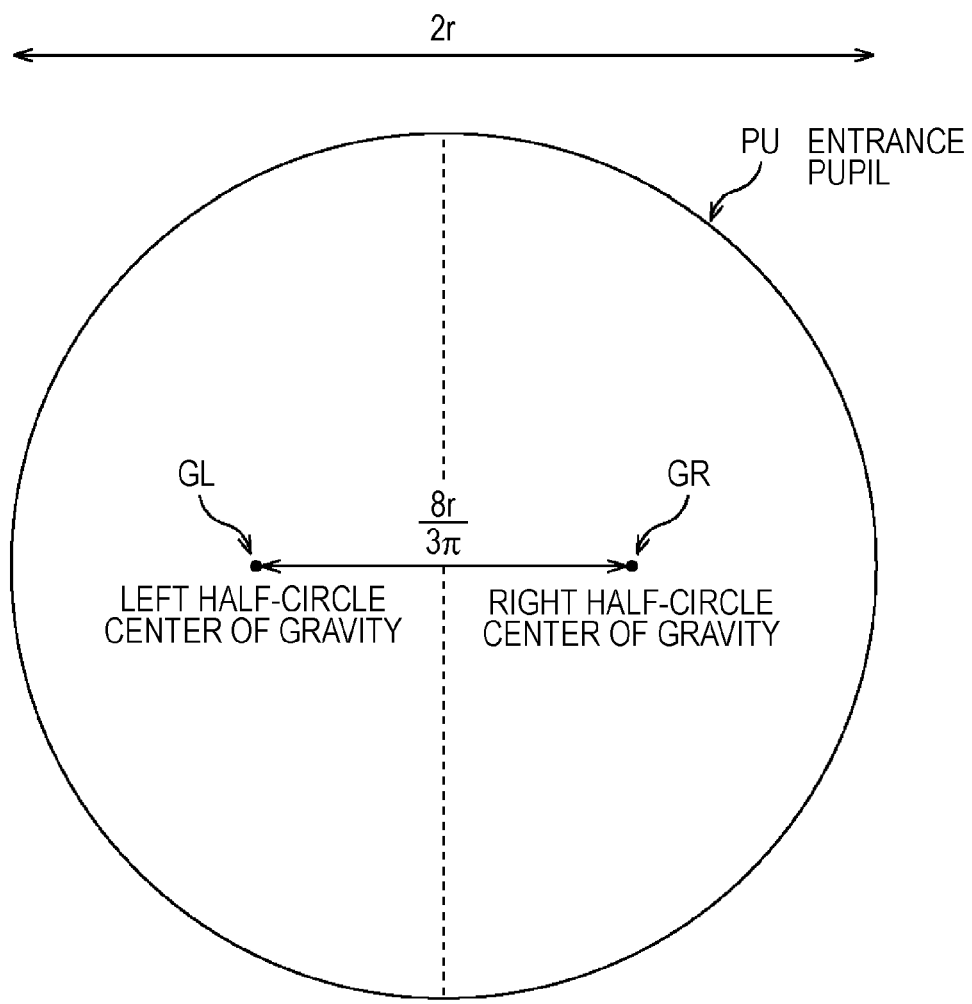
FIG. 3 is a conceptual drawing of the entrance pupil according to the imaging apparatus.

Next, description will be made regarding disparity of the right and left disparity image. FIG. 3 is a conceptual diagram of an entrance pupil PU in the imaging apparatus 11.

A pupil (pupil) is the image of an aperture stop when the lens has seen from the subject side or image formation side. With the imaging apparatus 11, the entrance pupil PU is the image of the diaphragm 34. Here, when the radius of the circle equivalent to the entrance pupil PU is r, the following Expression (2) holds.

$$2r = f/F \quad (2)$$

Note that in Expression (2), f is the focal distance of the relay lens unit 33, and F is an F-number of the relay lens unit 33. Accordingly, in the event that the focal distance is fixed, it can be seen that the diameter 2r of the entrance pupil PU is inversely proportionate to the F-number.

With the imaging apparatus 11, the converged incident light is split to the right and left at the position of the diaphragm 34, so we will consider the left half-circle and right half-circle where the circle of the entrance pupil PU has split to the right and left in FIG. 3. Three-dimensional effect is obtained based on the disparity between the user's eyes (relative disparity), however, with the entrance pupil PU, it can be thought that optical axes determining disparity pass through each center of gravity of the left half-circle and right half-circle.

The centers of gravity of the half-circles of the radius r can be found geometrically and are placed at the distance of $4r/3\pi$ from the center of the circle. Accordingly, the distance between the center of gravity GL of the left half-circle and the center of gravity GR of the right half-circle (distance D between centers of gravity) is found by the following Expression (3).

$$D=8r/3\pi \tag{3}$$

From this Expression (3), it can be seen that the distance D between centers of gravity, i.e., the distance between the centers of gravity of the light fluxes of the incident light split to the right and left at the transmissive mirror 35 is, when stopping the diaphragm 34 down, smaller in proportion thereto. In other words, adjusting the obtained three-dimensional effect can be realized by changing the aperture of the diaphragm 34. The results of an experiment performed to confirm this assumption will be described in the following.

[Relationship Between Distance Between Centers of Gravity and Base-Line Length (Base Line)]

FIG. 4 is a diagram illustrating a relationship between the distance D between centers of gravity and base-line length (base line). Here, theoretical values of the distance between centers of gravity and experimental values of the base-line length are indicated regarding two types of lenses, #A and #B, as the interchangeable lens 21.

The lens #A is a zoom lens of which the smallest F-stop is 1.8 and the focal distance is 10 to 100 mm. The zoom ratio of this lens #A is 10 times and the focal distance of the wide end (end of the wide-angle side) is 10 mm. The lens #B is a zoom lens of which the smallest F-stop is 2.8 and the focal distance is 13.5 to 570 mm. The zoom ratio of this lens #B is 42 times and the focal distance of the wide end (end of the wide-angle side) is 13.5 mm. The imaging distance (the distance from the subject to the imaging sensor) for both is assumed to be 6.5 m.

With the above-described Expression (2) and Expression (3), the distances D between centers of gravity of the lenses #A and #B are calculated to be 23.1 mm and 14.9 mm, respectively. On the other hand, in the measured value, the base-line length found by the experiment was 20.0 mm and 12.0 mm regarding lens #A and lens #B, respectively.

From this experimental result, it can be seen that while there is some decrease observed from the theoretical value which is presumed to be due to the diffraction effect, the distance D between centers of gravity of the half-circle of the entrance pupil PU which is the image of the diaphragm 34 approximately matches the base-line length. Also, it can be seen from Expression (3) that the distance D between centers of gravity can be changed by the aperture of the diaphragm 34, and accordingly, base-line length can be also controlled by the aperture of the diaphragm 34.

According to the imaging apparatus 11, the minimum value of the distance D between centers of gravity is assumed to be approximately 7 mm. It is thought that a value of this order as the base-line length can cause sensing of the three-dimensional effect. In particular, in the event that shooting distance is long, it is thought that unless the base-line length has a length of a certain level, the three-dimensional effect cannot be obtained. When increasing the base-line length, the three-dimensional effect is clearer at approximately 32 mm, but on the other hand the degree of blurriness of the background increases. When the base-line length reaches a region beyond 65 mm, it is thought that a puppet-theater effect will occur, resulting in unnatural image composition. Accordingly, it can be thought that a base-line length range yielding a natural looking stereoscopic image is approximately 7 to 65 mm.

[Relationship Between Magnification of Zoom and Disparity]

Figure 5:
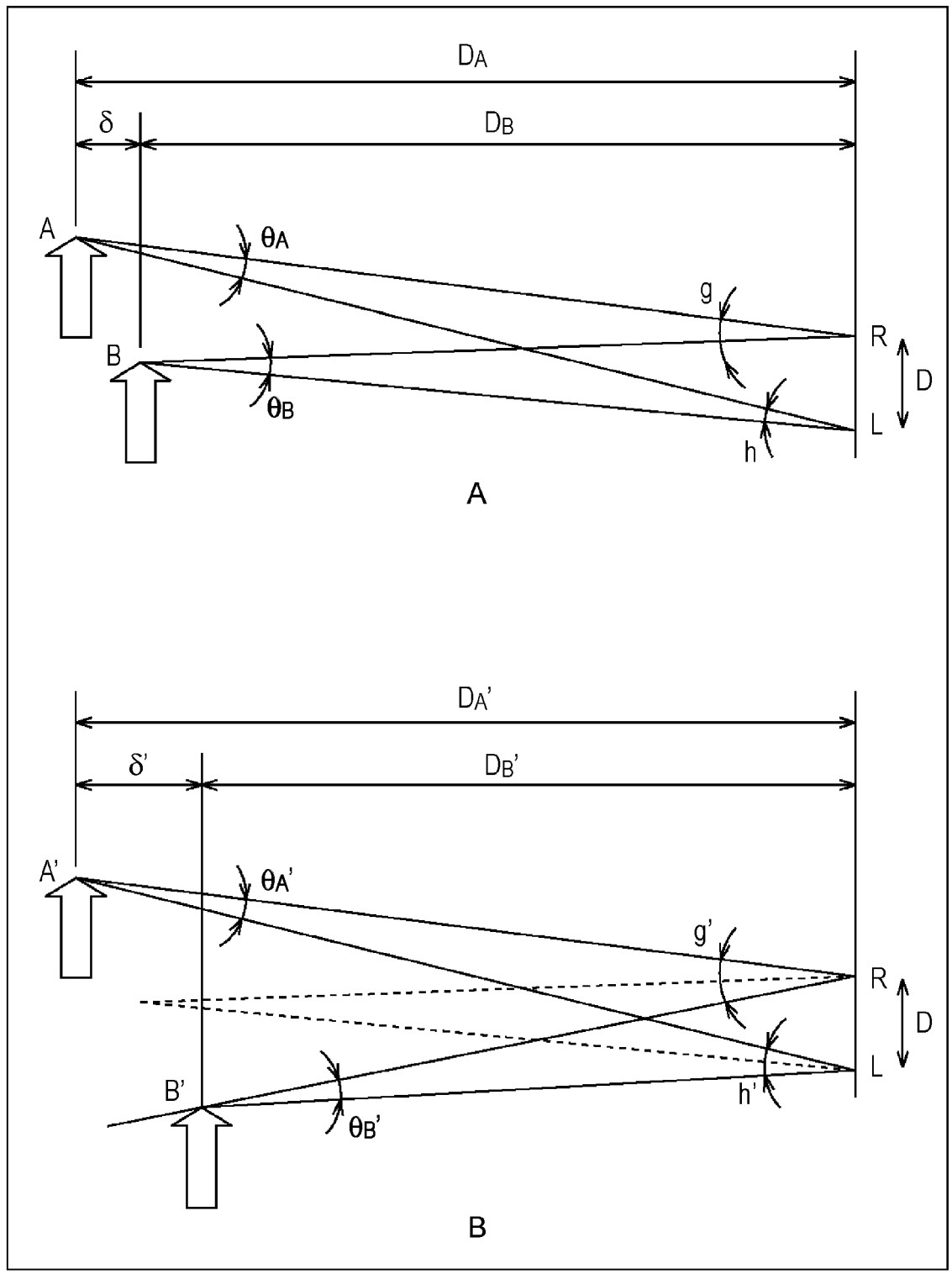
FIG. 5 is a diagram describing a relationship between zooming and disparity.

FIG. 5 is a diagram illustrating a relationship between magnification of the subject image by the zoom and disparity. In FIG. 5A, the position for the left eye is L, the position for the right eye is R, and dots on the subject are A and B. With angle LAR viewing point A as angle of convergence $\theta_A$ of point A, and angle LBR viewing point B as angle of convergence $\theta_B$ of point B, disparity d between point A and point B (relative disparity) is given by the following Expression (4).

$$d=\theta_B-\theta_A \tag{4}$$

Here, when angle ALB is h and angle ARB is g, the angle of convergence $\theta_A$ is approximately equal to angle h and the angle of convergence $\theta_B$ is approximately equal to angle g. Accordingly, the following Expression (5) is obtained by Expression (4).

$$d=g-h \tag{5}$$

Also, assuming that distance between both eyes is D, the distance from both eyes to a point A is $D_A$, the distance from the both eyes to a point B is $D_B$, and distance between point A and point B from both eyes is $\delta$, then $g \approx D/D_B$, $h \approx D/D_A$ and $D_B = D_A - \delta$ hold, so $d \approx D\delta/(D_A^2 - \delta D_A)$ is obtained by Expression (5). Here, $D_A \gg \delta$ holds, so $d \approx D\delta/D_A^2$ holds.

Also, FIG. 5B is a diagram illustrating positional relationship in the event that magnification of n times has been performed as compared with FIG. 5A. In FIG. 5B, a dash is affixed at the end of each symbol regarding the angle, position, and distance which have changed after zooming.

With the example in FIG. 5B, the subject image is magnified n times, so $g'=ng$ and $h'=nh$ hold. At this time, disparity d' is represented as in the following Expression (6).

$$\begin{aligned} d' &= \theta_{B'} - \theta_{A'} \\ &= g' - h' \\ &= n(g-h) \\ &= nd \end{aligned} \tag{6}$$

As can be understood from Expression (6), n-times disparity occurs by n-time magnification. This means that the three-dimensional effect of the subject image to be displayed is increased when being zoomed to the tele end side (end on the telephoto side). In other words, at the time of zoom shooting, appropriate disparity can be obtained even with a short base-line length.

In this way, according to the imaging apparatus 11, disparity of the image presented in front of both eyes can be suitably reduced, by splitting the light converged by the interchangeable lens 21 to the right and left using the transmissive mirror 35 and mirror 36.

The disparity obtained with the imaging apparatus 11 can be controlled by the aperture of the diaphragm 34 and zoom ratio (rate of magnification) at the time of zoom shooting. That is to say, disparity image with appropriate disparity can be obtained by controlling the aperture of the diaphragm 34 and zoom scale by the interchangeable lens 21.

Generally, sensitivity of eyes regarding disparity is high, and while visual acuity is normally measured in order of tenths of degrees for visual angle, it is said that the resolving power thereof regarding disparity is one order higher (see Howard I. P., Rogers B. J.: Stereo Acuity (Chap. 5), Binocular Vision and Stereopsis, P. 162, Oxford University Press, Oxford (1995).). Accordingly, to keep disparity suitably small is important to perceive the three-dimensional effect naturally and alleviate visual fatigue, even if under the condition where the disparity is within that of the above-described example.

[Another Configuration Example of Imaging Apparatus]

Note that, with the above, description has made that a disparity image is generated by the disparity detection image and basic image inside the imaging apparatus 11, but this may be also generated outside the imaging apparatus 11.

Figure 6:
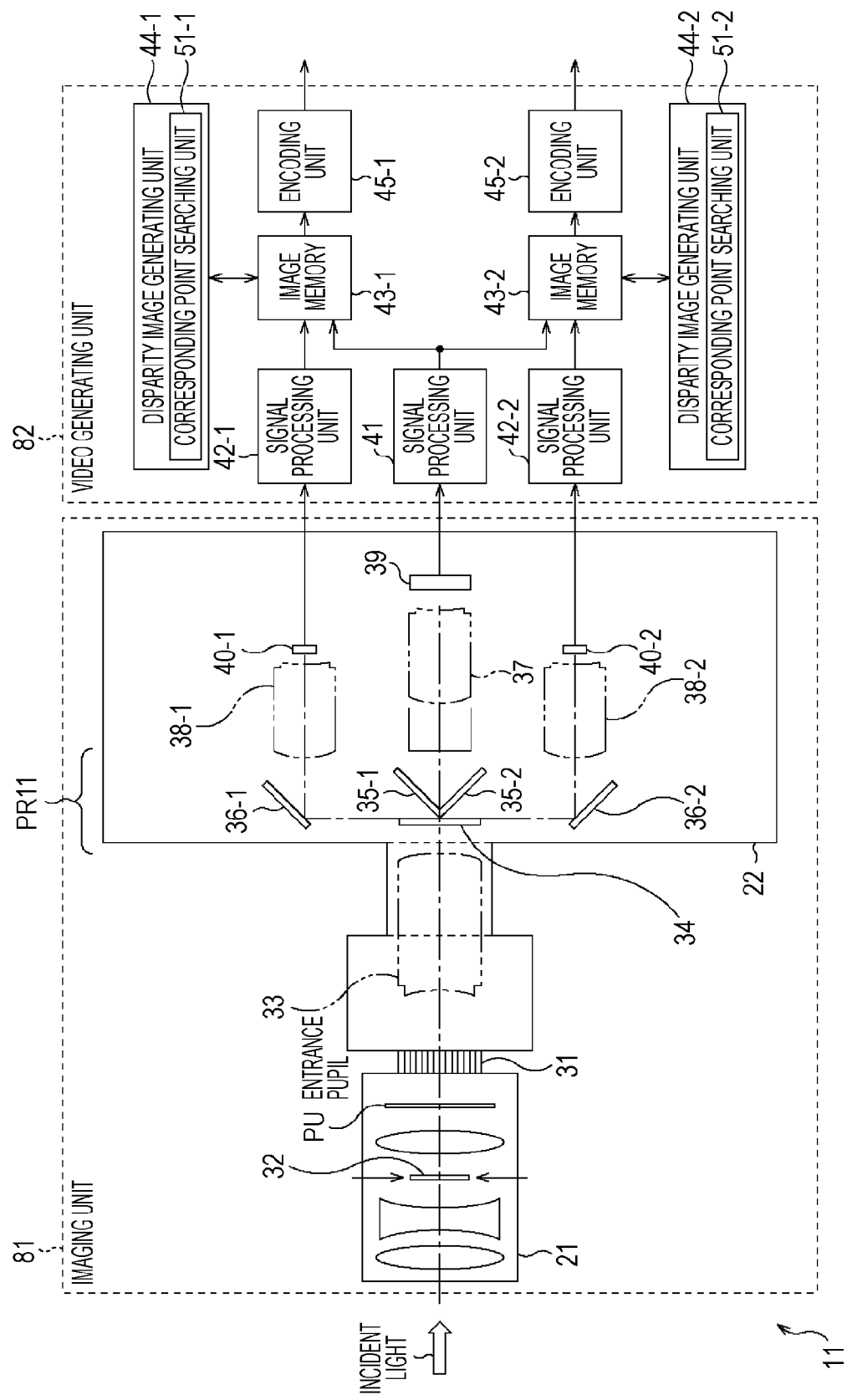
FIG. 6 is diagram illustrating another configuration example of an imaging apparatus.

In such a case, the imaging apparatus 11 is configured as illustrated in FIG. 6, for example. Note that in FIG. 6, the portions corresponding to the case in FIG. 1 are denoted with the same reference numerals and the description thereof will be omitted as appropriate.

In FIG. 6, the imaging apparatus 11 is different from the imaging apparatus 11 in FIG. 1 in that the signal processing unit 41 through encoding unit 45 are not provided and the other configurations are the same. That is to say, the imaging apparatus 11 in FIG. 6 is configured only of the imaging unit 81, and images the disparity detection image and basic image by receiving incident light from the subject, and outputs the obtained disparity detection image and basic image.

The disparity detection image and basic image output from the imaging apparatus 11 is input to the downstream video generating unit 82 and the video generating unit 82 generates and outputs the disparity image based on these image.

Second Embodiment

Configuration Example of Video Storage/Playing System

Figure 7:
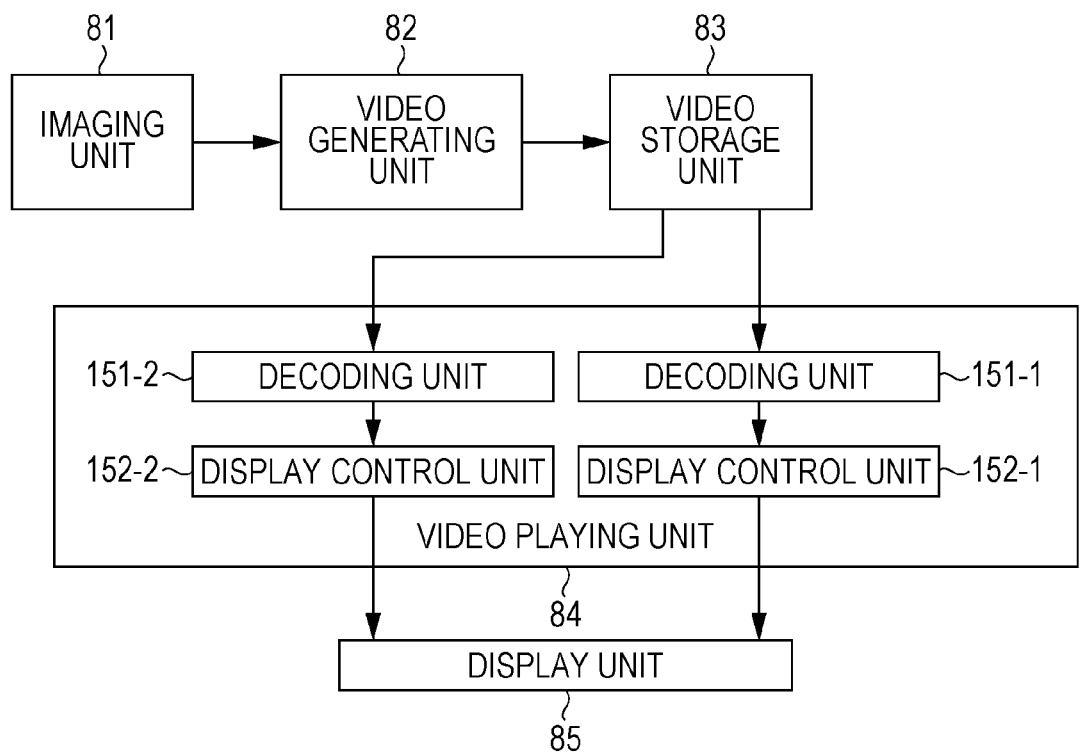
FIG. 7 is diagram illustrating a configuration example of an embodiment of a video storage/playing system to which the present invention has been applied.

Next, description will be made regarding another embodiment to which the present invention has been applied. FIG. 7 is a diagram illustrating a configuration example of a video storage/playing system to which the present invention has been applied. This video storage/playing system is configured of an of imaging unit 81, a video generating unit 82, a video storage unit 83, a video playing unit 84, and a display unit 85. Note that, in FIG. 7, the portions corresponding to the case in FIG. 1 are denoted with the same reference numerals and the description thereof will be omitted as appropriate.

The imaging unit 81 images basic image and right and left disparity detection images and supplies these to the video generating unit 82. The video generating unit 82 generates disparity images using the basic image and disparity detection images supplied from the imaging unit 81, and stores these in the video storage unit 83.

The video storage unit 83 temporarily stores the disparity image supplied from the video generating unit 82. The video playing unit 84 reads out the disparity image from video storage unit 83 and supplies this to the display unit 85 so as to display the stereoscopic image on the display unit 85.

The video playing unit 84 is configured of a decoding unit 151-1, a decoding unit 151-2, a display control unit 152-1, and a display control unit 152-2. The decoding unit 151-1 and decoding unit 151-2 read out and decode each of the disparity image for the left eye and disparity image for the right eye from the video storage unit 83 and supplies these to the display control unit 152-1 and display control unit 152-2.

The display control unit 152-1 and display control unit 152-2 supplies the disparity images supplied from the decoding unit 151-1 and decoding unit 151-2 to the display unit 85 so as to be displayed. Note that, in the following, in the event that there is no need to distinguish between the decoding unit 151-1 and decoding unit 151-2 in particular, these will be referred to simply as decoding unit 151, and in the event that here is no need to distinguish between the display control unit 152-1 and display control unit 152-2 in particular, these will be referred to simply as display control unit 152.

The display unit 85 performs stereoscopic display on the disparity image supplied from the display control unit 152 with a predetermined display format. For example, an arrangement may be conceived for the display unit 85 wherein circularly polarized light or linearly polarized light filters are assembled into two projectors, so as to present each of right and left disparity images, and a user wears circularly polarized light or linearly polarized light glasses corresponding to the display, and views the disparity image.

Also, the display unit 85 may be configured of a flat panel display with a filter, and use a display system with no glasses for viewing, such as a lenticular system or a parallax barrier system, whereby right and left disparity images may be presented to the flat panel display at the same time. In particular, with the display system in the display unit 85, employing a display format where the right and left disparity images are not displayed alternately these disparity images are displayed at the same time, enables visual fatigue of a user to be alleviated.

[Description of Disparity Image Generating Processing]

Next, description will be made regarding operation of a video storage/playing system.

Figure 8:
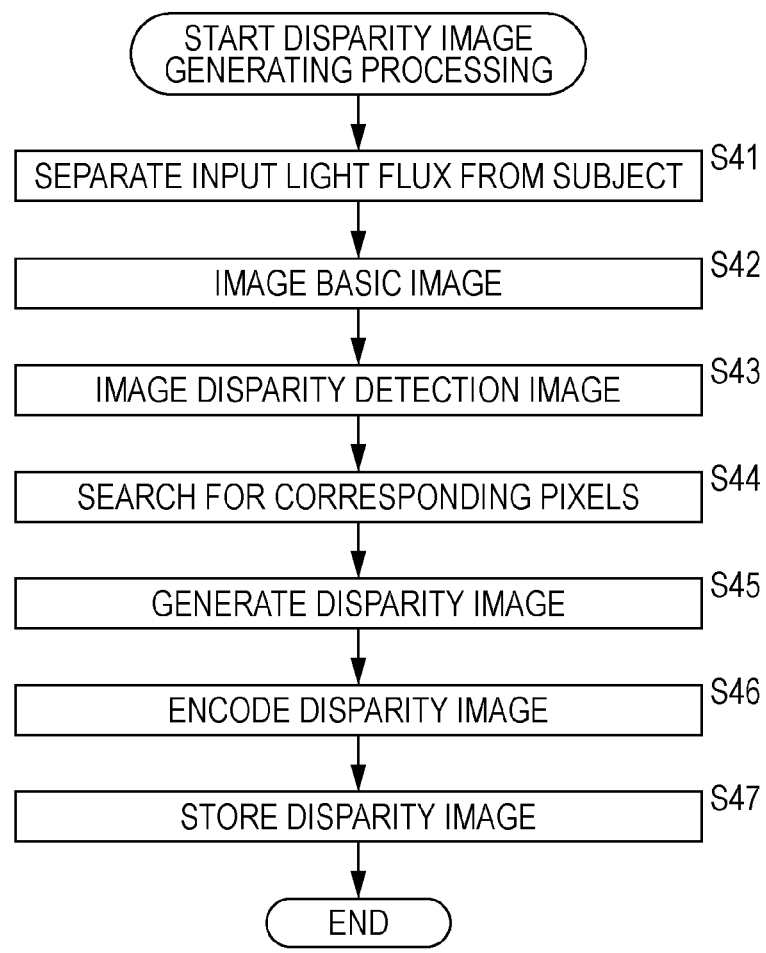
FIG. 8 is a flowchart describing disparity image generating processing.

For example, when a user instructs the video storage/playing system to generate right and left disparity images so as to perform stereoscopic display of the subject, the video storage/playing system starts disparity image generating processing and generates disparity images. In the following, description will be made regarding disparity image generating processing performed by the video storage/playing system, with reference to the flowchart in FIG. 8.

Figure 2:
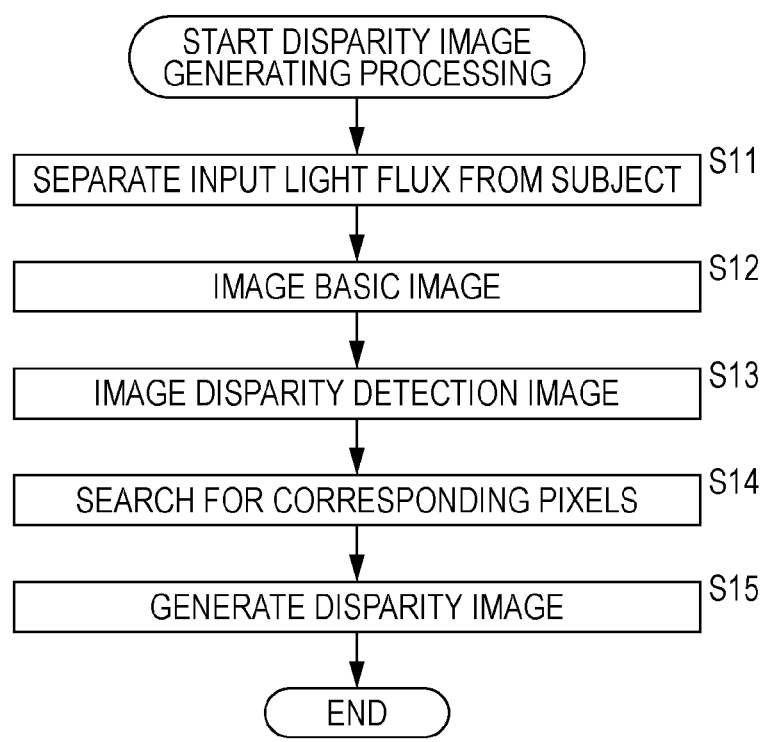
FIG. 2 is a flowchart describing disparity image generating processing.

Note that processing in step S41 through step S45 is the same as the processing in step S11 through step S15 in FIG. 2, so the description thereof will be omitted as appropriate. With these processes, when disparity images are generated, the generated disparity images are supplied to the image memory 43 and stored.

In step S46, then, the encoding unit 45 in the video generating unit 82 reads out and encodes disparity images from the image memory 43, and supplies to the video storage unit 83. In step S47, the video storage unit 83 stores the disparity images supplied from the encoding unit 45 and the disparity image generating processing is ended.

As described above, at the transmissive mirror 35, the incident light is transmitted by a predetermined transmittance and the basic image is imaged, and at the same time the other incident light is split to the right and left and the right and left disparity detection images are imaged, thereby obtaining disparity information without deteriorating image quality of the subject image.

[Description of Disparity Image Playing Processing]

Figure 9:
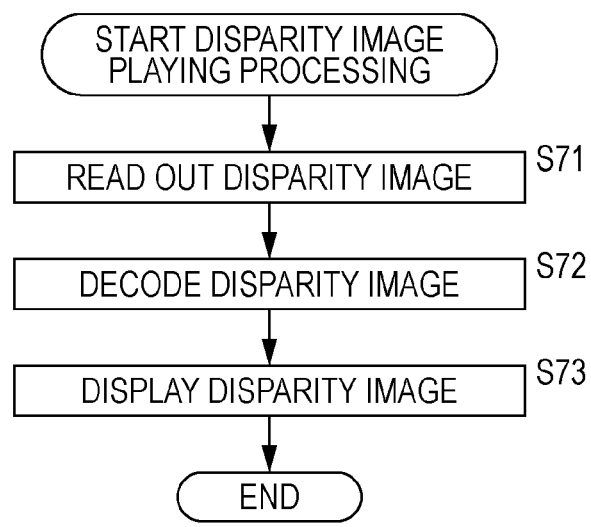
FIG. 9 is a flowchart describing disparity image playing processing.

Next, with reference to the flowchart in FIG. 9, description will be made regarding disparity image playing processing to play disparity image, based on the disparity image stored in the video storage unit 83 by disparity image generating processing. This disparity image playing processing is started when playing of the disparity image is instructed by the user.

In step S71, the decoding unit 151 reads out the instructed disparity image to be played from the video storage unit 83. In step S72, the decoding unit 151 decodes the read out disparity image and supplies this to the display control unit 152.

In step S73, the display control unit 152 supplies the disparity image supplied from the decoding unit 151 to the display unit 85 so as to perform stereoscopic display and the disparity image playing processing is ended. Thus, stereoscopic display of a subject in the disparity image is performed at the display unit 85.

Incidentally, with the video storage/playing system in FIG. 7, motion blurring (Blur) and jerkiness (Jerkiness) can be reduced by speeding up the frame rate from generating disparity image until displaying disparity image.

Motion blurring often happens due to slipping of video on the retina at the time of following and watching a moving subject (eye pursuit) with a hold-type display in particular, in addition to a decline of MTF (Modulation Transfer Function) when imaging. Here, a hold-type display is a display method where video is continuously displayed on a film, a crystal projector, or the like, during a frame period.

Also, jerkiness means that smoothness of video is lost and motions are jerky. This jerkiness often happens at the time of fixing line of sight to watch video imaged using a high-speed shutter (fixation viewing). The frame rate of imaging and displaying, the aperture ratio of imaging of the camera (open time/frame time), visual perception properties, and the like, are involved in such deterioration of the moving image quality.

Frame rates of 24 frames per second (24 Hz) for movies, and 60 fields per second (60 Hz) for television broadcasting, are normally used. With the video storage/playing system, taking into consideration blurring due to motion and jerkiness, imaging of the disparity detection images and basic image is performed at a rate more than 60 frames per second (60 Hz), preferably a rate of 230 to 250 frames per second (240 Hz±10 Hz). Thus, insufficient resolving power in the temporal direction can be solved and accurate outline information can be also obtained as to the moving subject.

Further, when taking into consideration of broadcasting systems, a rate of 290 to 310 frames per second (300 Hz±10 Hz) is important as a common multiple of 50 frames (50 Hz) per second often used in Europe and 60 frames per second (60 Hz) often used in Japan and the United States of America in that a rate of per-second frames (300 Hz±10 Hz) facilitates image processing such as image compositing, rate conversion processing, and so forth.

Further, a rate of 590 to 610 frames per second (600 Hz±10 Hz) is also important as a common multiple which further includes 24 frames per second (24 Hz) of movies in this rate of 290 to 310 frames per second (300 Hz±10 Hz) in that image processing is facilitated. Accordingly, imaging of the disparity detection images and basic image may be performed with a rate of 290 to 310 frames per second and a rate of 590 to 610 frames per second.

In this way, according to the video storage/playing system, setting disparity of the image presented to both eyes to an appropriate magnitude, and further speeding up the frame rate when imaging image, enables imaging of high-quality stereoscopic images similar as what people see the natural world, readily viewed and with little aberration. Also, the optical axis is not actually changed by the zoom ratio of the interchangeable lens 21 and there is no need to have image processing such as moving the position of the image depending on the zoom ratio, so high-precision zoom effect can be easily realized.

[Another Configuration Example of Video Storage/Playing System]

Further, in FIG. 7, as an example of the video storage/playing system, description has made regarding a case where disparity image is generated from the disparity detection images and basic image, where various signal processing has been performed, however, disparity image may be generated from these images in the state where the disparity detection images and basic image are RAW images.

Figure 10:
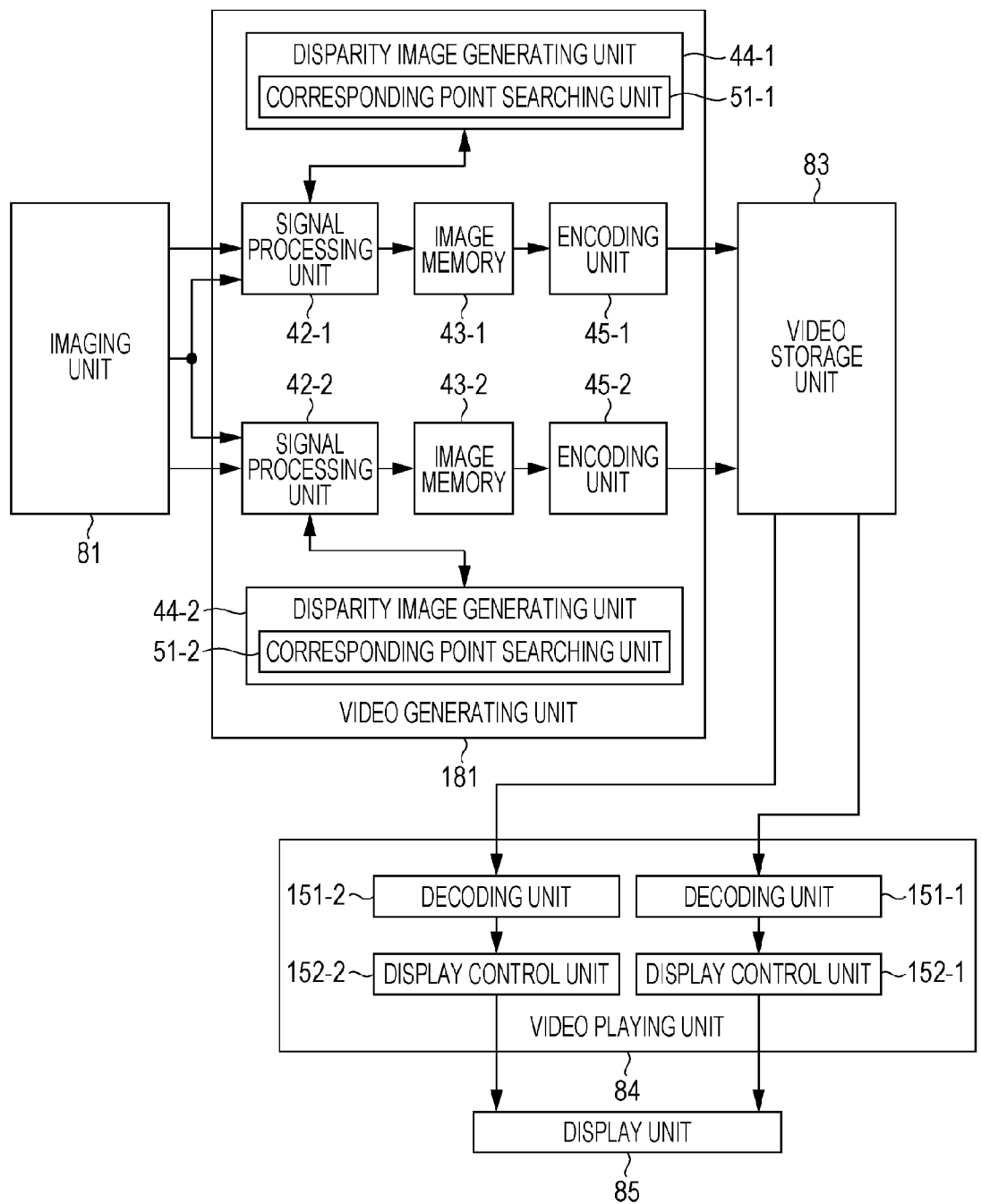
FIG. 10 is diagram illustrating another configuration example of the video storage/playing system.

In such a case, the video storage/playing system is configured as shown in FIG. 10, for example. Note that, in FIG. 10, the portions corresponding to the case in FIG. 1 or FIG. 7 are denoted with the same reference numerals and the description thereof will be omitted as appropriate.

The video storage/playing system in FIG. 10 is different from the video storage/playing system in FIG. 7 in that a video generating unit 181 is provided instead of the video generating unit 82 of the video storage/playing system in FIG. 7, and the other configurations are the same.

With the video storage/playing system in FIG. 10, disparity detection image and basic image are supplied from the imaging unit 81 to the video generating unit 181. That is to say, the basic image output from the imaging device 39 of the imaging unit 81 is supplied to the signal processing unit 42-1 and signal processing unit 42-2 of the video generating unit 181. Also, the disparity detection images output from the imaging device 40-1 and imaging device 40-2 of the imaging unit 81 are supplied to the signal processing unit 42-1 and signal processing unit 42-2 of the video generating unit 181.

The signal processing unit 42-1 subjects the disparity detection image and basic image supplied from the imaging unit 81 to A/D conversion processing and supplies to the disparity image generating unit 44-1. The disparity image generating unit 44-1 generates disparity image based on the disparity detection image and basic image supplied from the signal processing unit 42-1 and supplies these to the signal processing unit 42-1. At this time, the corresponding point searching unit 51-1 provided to the disparity image generating unit 44-1 searches for the corresponding pixels from the basic image, regarding each pixel of the disparity detection image.

Also, the signal processing unit 42-1 subjects the disparity image supplied from the disparity image generating unit 44-1 to various signal processing such as demosaicing processing, and white balance adjustment processing and supplies this to the image memory 43-1 so as to be stored. The disparity image supplied to the image memory 43-1 is reads out by the encoding 45-1 and encoded, and supplied to the video storage unit 83.

In the same way, the signal processing unit 42-2 subjects the disparity detection image and basic image supplied from the imaging unit 81 to A/D conversion processing and supplies to the disparity image generating unit 44-2. The disparity image generating unit 44-2 generates disparity image based on the disparity detection image and basic image supplied from the signal processing unit 42-2 and supplies these to the signal processing unit 42-2. At this time, the corresponding point searching unit 51-2 provided to the disparity image generating unit 44-2 searches for the corresponding pixels from the basic image, regarding each pixel of the disparity detection image.

Also, the signal processing unit 42-2 subjects the disparity image supplied from the disparity image generating unit 44-2 to various signal processing such as demosaicing processing and white balance adjustment processing, and supplies this to the image memory 43-2 so as to be stored. The disparity image supplied to the image memory 43-2 is reads out by the encoding 45-2 and encoded, and supplied to the video storage unit 83.

In this way, generating a disparity image in a state where the disparity detection image and basic image are RAW images enables higher-quality disparity images to be obtained.

Note that the embodiment of the present invention is not limited to the above-described embodiment, and that various modifications may be made without departing from the essence of the present invention.

REFERENCE SIGNS LIST

11 imaging apparatus
21 interchangeable lens
33 relay lens unit
34 diaphragm
35-1, 35-2, and 35 transmissive mirror
36-1, 36-2, and 36 mirror
37 condenser lens
38-1, 38-2, and 38 condenser lens
39 imaging device
40-1, 40-2, and 40 imaging device
44-1, 44-2, and 44 disparity image generating unit
51-1, 51-2, and 51 corresponding point searching unit

The invention claimed is:

1. An imaging apparatus comprising:
   first converging means to converge incident light from a subject;
   transmitting means to transmit the incident light converged by the first converging means to be parallel light;
   splitting means to transmit, at a predetermined transmittance, the incident light made to be parallel light by the transmitting means, and also split part of the incident light made to be the parallel light to the right and left;
   second converging means to converge the incident light transmitted from the splitting means;
   first imaging means to image a basic image of the subject, by converting the incident light converged by the second converging means into electric signals;
   third converging means to converge each incident light split by the splitting means;
   second imaging means to image disparity detection images having disparity as to each other, by converting each of the incident light converged by the third converging means into electrical signals; and
   disparity image generating means to generate disparity images so as to perform stereoscopic display of the subject, by generating images with the same point of view as with the disparity detection images, regarding each of the disparity detection images, based on the basic image.

2. The imaging apparatus according to claim 1, wherein the disparity image generating means generates the disparity images at least in part by:
   taking a pixel of the disparity image to be generated as the pixel of interest, and
   obtaining a pixel value of the pixel of interest, based on a pixel value of the pixel in the base image corresponding to the pixel of the disparity detection image which is at the same position as the pixel of interest.

3. The imaging apparatus according to claim 1, further comprising:
   amount of light adjusting means, being arranged between the transmitting means and splitting means, for shielding part of the incident light from the transmitting means so as to change the distance between centers of gravity of the incident light split to the right and left by the splitting means.

4. The imaging apparatus according to claim 3, wherein the amount of light adjusting means shields part of the incident light so that the distance between centers of gravity is 7 to 65 mm.

5. The imaging apparatus according to claim 1, wherein:
   the first converging means comprises a zoom lens to magnify an image of the subject, and
   relative disparity between the disparity detection image is controlled by magnification of the image of the subject by the zoom lens.

6. The imaging apparatus according to claim 1, wherein the first imaging means and the second imaging means image the basic image and disparity detection images with a rate of 60 frames per second or more.

7. The imaging apparatus according to claim 6, wherein the first imaging means and the second imaging means image the basic image and disparity detection images with a rate of 230 to 250 frames per second.

8. The imaging apparatus according to claim 6, wherein the first imaging means and the second imaging means image the basic image and disparity detection images with a rate of 290 to 310 frames per second.

9. The imaging apparatus according to claim 6, wherein the first imaging means and the second imaging means image the basic image and disparity detection images with a rate of 590 to 610 frames per second.

10. The imaging apparatus according to claim 1, further comprising:
    storage means to store the disparity images; and
    display control means to perform stereoscopic display of the subject, based on the disparity images stored in the storage means.

11. An imaging method of an imaging apparatus including first converging means to converge incident light from a subject, transmitting means to transmit the incident light converged by the first converging means to be parallel light, splitting means to transmit, at a predetermined transmittance, the incident light made to be parallel light by the transmitting means and also split part of the incident light to be the parallel light to the right and left, second converging means to converge the incident light transmitted from the splitting means, first imaging means to image a basic image of the subject, by converting the incident light converged by the second converging means into electric signals, third converging means to converge each incident light split by the splitting means, second imaging means to image disparity detection image having disparity as to each other, by converting each of the incident light converged by the third converging means into electrical signals, and disparity image generating means to generate disparity images so as to perform stereoscopic display of the subject, by generating images with the same point of view as with the disparity detection images, regarding each of the disparity detection images, based on the basic image, the method comprising the steps of:
    converging, with the first converging means, the incident light;
    transmitting, with the transmitting means, the incident light from the first converging means;
    splitting, with the splitting means, part of the incident light while transmitting the incident light from the transmitting means;
    converging, with the second converging means, the incident light which has transmitted the splitting means;
    imaging, with the first imaging means, the basic image;

converging, with the third converging means, the split incident light;

imaging, with the second imaging means, the disparity detection images; and generating, with the disparity image generating means, disparity images so as to perform stereoscopic display of the subject, wherein the generating the display images comprises generating images with the same point of view as with the disparity detection images, regarding each of the disparity detection images, based on the basic image.

\* \* \* \* \*